Figures 1, 2:
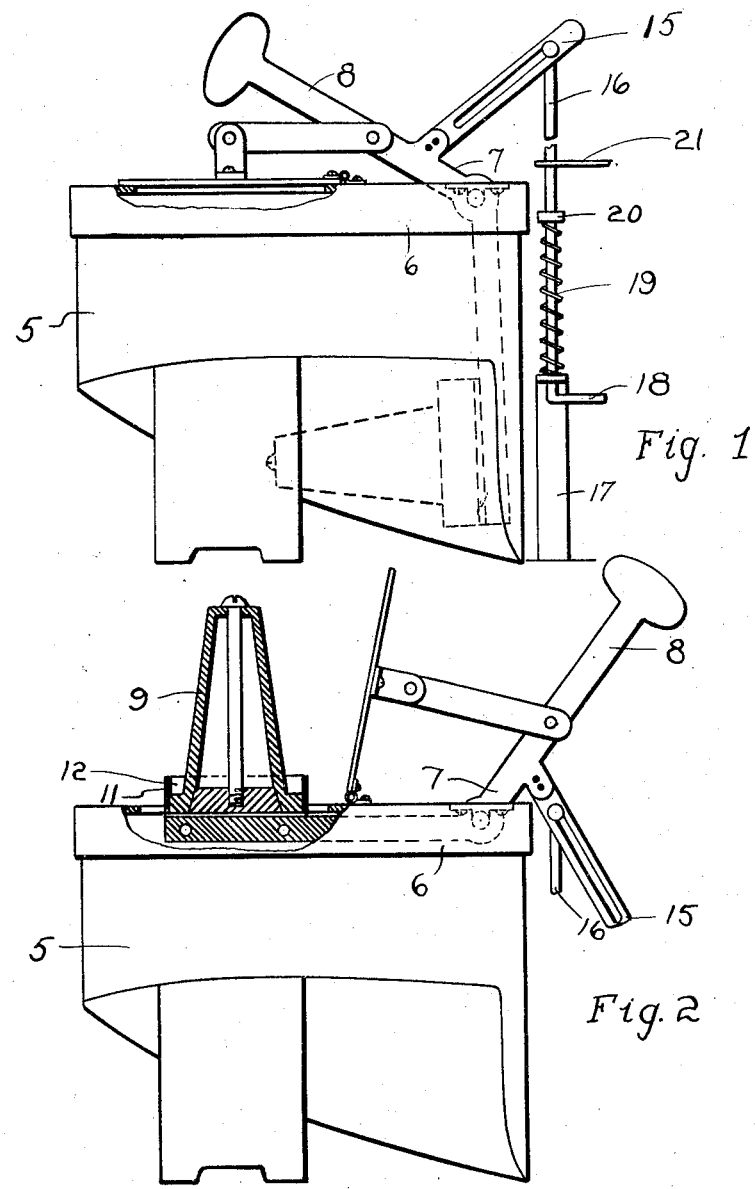

Dec. 16, 1930.   O. LANGE   1,784,992
ICE CREAM CONE COATER
Filed Aug. 13, 1925

INVENTOR.
Otto Lange
BY E.J. Andrews
ATTORNEY.

Patented Dec. 16, 1930

1,784,992

UNITED STATES PATENT OFFICE

OTTO LANGE, OF CHICAGO, ILLINOIS

ICE-CREAM-CONE COATER

Application filed August 13, 1925. Serial No. 49,955.

This invention relates to ice-cream cone coaters and has for its object the production of apparatus for coating the surface of ice-cream cones and other articles with chocolate or other substances. Although in the drawings and in the following description I have shown the apparatus adapted to the purpose of coating the inside of the cones, yet it is to be understood that modifications could be made of the apparatus, by those skilled in the art, for coating the outside of cones, and the apparatus as shown could readily be modified and applied to the coating of various articles, such as edible dessert dishes, as well as to ice cream cones.

Of the accompanying drawings Fig. 1 is an elevation of the apparatus when not in use, and Fig. 2 is an elevation of the apparatus embodying features of my invention, in position for coating the cones.

The apparatus comprises a casing or jar 5 which may be of any suitable material. The jar has a cover 6. Mounted in the cover is a lever 7 which is pivoted to the cover. Fixed to the upper arm of the lever is a handle 8 and fixed to the lower end is the coater which comprises a member having a surface shaped similarly to the inner surface of that portion of the cone to be coated. Normally the coater is suspended downwardly in the jar and the jar contains the material which is to coat the cone. When in use, the coater, carrying with it a coat of the material, is turned upwardly by operating the handle 8 so as to pass the coater through the opening 10 and project it upwardly as indicated in Fig. 2. The coater will then have on its outer surface a coat of chocolate which may be imparted to the inner surface of the cone by placing the cone over the coater. The coater is then lowered for a new coat and the process may be repeated as often as may be desired.

It is desirable to coat not only the inside of the cones but also the ends, and on the outside for a short distance from the large ends of the cones. To accomplish this I provide an annular flange 11 around the large end of the coater 9, thus forming an annular groove 12 which becomes filled with the coating substance as the coater is raised in the container, and by pressing the cones over the coater and into this groove the cone is coated inside and as much outside as may be desired depending on the depth of the groove 12.

It is sometimes desirable to operate the coater by means of the foot. For this purpose any suitable means may be used. I prefer for the purpose to have fixed to the lever 7 an arm 15 to which is pivoted a link 16. The lower end of the link is guided by a bracket 17 and a pedal 18 is fixed to this end. When the pedal is forced downwardly the coater will be operated. A spring 19 backed by a collar 20 will then force the link upwardly and close the casing. A guide 21 assists in holding the link vertically.

I claim as my invention:

1. A coating device comprising a casing adapted to hold the coating material, a cover for said casing, a lever pivotally associated with the cover and with one end projecting into said casing and the other end projecting outwardly, and a coating member fixed to the inwardly projecting lever end and adapted to be revolved upwardly by said lever, said coating member having an annular flange projecting horizontally outwardly from its inner end and a second annular flange projecting from the periphery of said first mentioned flange towards the outer end of the member.

2. A coating apparatus comprising a casing, a cover adapted to be fixed to said casing, a lever pivoted to said cover with one end projecting inwardly and the other end projecting outwardly, a coating member fixed to the inwardly projecting end of the lever and adapted to be revolved upwardly, said cover having an opening therein through which said coating member will project when revolved upwardly, said member having an annular flange projecting outwardly from its inner end, said flange having a groove therein adapted to receive coating material.

3. A coating apparatus comprising a casing, a cover adapted to be fixed to said casing, a lever pivoted to said cover with one end projecting inwardly and the other end projecting outwardly, a coating member fixed to the inwardly projecting end of the lever and adapted to be revolved upwardly, said cover having an opening therein through which said coating member will project when revolved upwardly, an arm for operating said lever, a second arm fixed to said first mentioned arm and projecting over the side of said casing, and foot operable means depending from said second arm.

4. A coating apparatus as claimed in claim 3, and comprising resilient means normally holding said operable means upwardly.

In testimony whereof, I hereunto set my hand.

OTTO LANGE.